US011008458B2

(12) United States Patent
Jogikalmath et al.

(10) Patent No.: US 11,008,458 B2
(45) Date of Patent: May 18, 2021

(54) ARTICLES WITH IMPROVED FLAME RETARDANCY AND/OR MELT DRIPPING PROPERTIES

(71) Applicant: QED Labs Inc., Waltham, MA (US)

(72) Inventors: Gangadhar Jogikalmath, Chestnut Hill, MA (US); Deepak Arabagatte Ramappa, Somerville, MA (US)

(73) Assignee: QED Labs Inc., Waltham, MA (US)

( * ) Notice: Subject to any disclaimer, the term of this patent is extended or adjusted under 35 U.S.C. 154(b) by 120 days.

(21) Appl. No.: 16/085,812

(22) PCT Filed: Mar. 16, 2017

(86) PCT No.: PCT/US2017/022712
§ 371 (c)(1),
(2) Date: Sep. 17, 2018

(87) PCT Pub. No.: WO2017/161120
PCT Pub. Date: Sep. 21, 2017

(65) Prior Publication Data
US 2019/0048188 A1  Feb. 14, 2019

Related U.S. Application Data

(60) Provisional application No. 62/309,465, filed on Mar. 17, 2016.

(51) Int. Cl.
| | | |
|---|---|---|
| *C08L 77/04* | (2006.01) | |
| *B32B 27/08* | (2006.01) | |
| *B32B 27/06* | (2006.01) | |
| *B32B 27/18* | (2006.01) | |
| *C09K 21/14* | (2006.01) | |

(Continued)

(52) U.S. Cl.
CPC ............ *C08L 77/04* (2013.01); *B29C 64/118* (2017.08); *B29C 64/153* (2017.08); *B32B 5/16* (2013.01); *B32B 5/18* (2013.01); *B32B 5/26* (2013.01); *B32B 5/30* (2013.01); *B32B 5/32* (2013.01); *B32B 25/042* (2013.01); *B32B 25/12* (2013.01); *B32B 25/14* (2013.01); *B32B 25/16* (2013.01); *B32B 27/06* (2013.01); *B32B 27/08* (2013.01); *B32B 27/18* (2013.01); *B32B 27/28* (2013.01); *B32B 27/281* (2013.01); *B32B 27/285* (2013.01); *B32B 27/286* (2013.01); *B32B 27/288* (2013.01); *B32B 27/302* (2013.01); *B32B 27/304* (2013.01); *B32B 27/32* (2013.01); *B32B 27/34* (2013.01); *B32B 27/36* (2013.01); *B32B 27/365* (2013.01); *B32B 27/38* (2013.01); *B32B 27/40* (2013.01); *B33Y 10/00* (2014.12); *C08K 3/042* (2017.05); *C08K 3/32* (2013.01); *C08K 3/36* (2013.01); *C08K 5/0066* (2013.01); *C08K 5/50* (2013.01); *C08K 5/521* (2013.01);

(Continued)

(58) Field of Classification Search
CPC ....... B32B 27/286; B32B 27/34; B32B 27/28; B32B 27/304; B32B 5/16; B32B 27/38; B32B 27/285; B32B 5/18; B32B 27/365; B32B 25/14; B32B 25/16; B32B 5/26; B32B 27/08; B32B 27/281; B32B 27/36; B32B 27/32; B32B 5/30; B32B 27/40; B32B 5/32; B32B 27/288; B32B 25/12; B32B 27/302; B32B 27/06; B32B 27/18; B32B 25/042; B32B 2262/08; B32B 2250/02; B32B 2264/104; B32B 2264/102; B32B 2262/101; B32B 2264/062; B32B 2264/101; B32B 2307/51; B32B 2307/73; B32B 2307/3065; B32B 2262/04; B32B 2270/00; B32B 2262/0269; B32B 2264/0264; B32B 2307/50; B32B 2250/03; B32B 2264/105; B32B 2264/108; B32B 2274/00; C08K 3/32; C08K 5/50; C08K 5/521; C08K 3/042; C08K 3/36; C08K 5/0066; C08K 9/06; C08K 2003/327; C08L 23/06; C08L 77/04; C08L 67/02; C08L 55/02; C08L 75/04; C08L 2312/00; C08L 2201/02; B33Y 10/00; B33Y 70/00; B33Y 80/00; B29C 64/153; B29C 64/118; B29C 48/18; B29C 45/0001; C09K 21/14

See application file for complete search history.

(56) References Cited

U.S. PATENT DOCUMENTS

| | | | | |
|---|---|---|---|---|
| 4,147,741 A | * | 4/1979 | Slama ..................... | C08K 5/17 524/371 |
| 5,418,272 A | | 5/1995 | Kawabata et al. | |

(Continued)

FOREIGN PATENT DOCUMENTS

| | | |
|---|---|---|
| CN | 102321295 A | 1/2012 |
| JP | H0762158 A | 3/1995 |

(Continued)

OTHER PUBLICATIONS

Product Data Sheet for DER 332 (Year: 2001).*
WIPO, WO/ISR for Patent Application No. PCT/US2017/022712, dated May 25, 2017.

*Primary Examiner* — Angela C Scott
(74) *Attorney, Agent, or Firm* — Hodgson Russ LLP

(57) ABSTRACT

Compositions of injection molded articles, multilayer extruded articles, and 3D printed articles with improved flame properties and with improved melt dripping properties are disclosed. Improved flame resistant articles may be beneficial for a large number of injection molded parts, 3D printed parts, and extruded parts. Reduced melt dripping also may be beneficial for such applications. Methods for using such compositions, printed parts, molded parts, and extruded parts are disclosed.

19 Claims, 12 Drawing Sheets

(51) Int. Cl.
| | | |
|---|---|---|
| B33Y 10/00 | (2015.01) | |
| B32B 27/30 | (2006.01) | |
| B32B 5/32 | (2006.01) | |
| B32B 27/32 | (2006.01) | |
| B32B 5/30 | (2006.01) | |
| B32B 25/14 | (2006.01) | |
| B32B 25/16 | (2006.01) | |
| B32B 5/16 | (2006.01) | |
| B32B 25/12 | (2006.01) | |
| B32B 27/40 | (2006.01) | |
| B32B 5/18 | (2006.01) | |
| B32B 27/36 | (2006.01) | |
| B32B 27/28 | (2006.01) | |
| B32B 25/04 | (2006.01) | |
| B32B 27/34 | (2006.01) | |
| B32B 5/26 | (2006.01) | |
| B32B 27/38 | (2006.01) | |
| C08K 3/04 | (2006.01) | |
| B29C 64/118 | (2017.01) | |
| B29C 64/153 | (2017.01) | |
| C08K 3/32 | (2006.01) | |
| C08K 3/36 | (2006.01) | |
| C08K 5/00 | (2006.01) | |
| C08K 5/50 | (2006.01) | |
| C08K 5/521 | (2006.01) | |
| C08K 9/06 | (2006.01) | |
| C08L 23/06 | (2006.01) | |
| C08L 55/02 | (2006.01) | |
| C08L 67/02 | (2006.01) | |
| C08L 75/04 | (2006.01) | |
| B33Y 70/00 | (2020.01) | |
| B33Y 80/00 | (2015.01) | |
| B29C 48/18 | (2019.01) | |
| B29C 45/00 | (2006.01) | |

(52) U.S. Cl.
CPC .............. *C08K 9/06* (2013.01); *C08L 23/06* (2013.01); *C08L 55/02* (2013.01); *C08L 67/02* (2013.01); *C08L 75/04* (2013.01); *C09K 21/14* (2013.01); *B29C 45/0001* (2013.01); *B29C 48/18* (2019.02); *B32B 2250/02* (2013.01); *B32B 2250/03* (2013.01); *B32B 2262/0269* (2013.01); *B32B 2262/04* (2013.01); *B32B 2262/08* (2013.01); *B32B 2262/101* (2013.01); *B32B 2264/0264* (2013.01); *B32B 2264/062* (2013.01); *B32B 2264/101* (2013.01); *B32B 2264/102* (2013.01); *B32B 2264/104* (2013.01); *B32B 2264/105* (2013.01); *B32B 2264/108* (2013.01); *B32B 2270/00* (2013.01); *B32B 2274/00* (2013.01); *B32B 2307/3065* (2013.01); *B32B 2307/50* (2013.01); *B32B 2307/51* (2013.01); *B32B 2307/73* (2013.01); *B33Y 70/00* (2014.12); *B33Y 80/00* (2014.12); *C08K 2003/327* (2013.01); *C08L 2201/02* (2013.01); *C08L 2312/00* (2013.01)

(56) References Cited

U.S. PATENT DOCUMENTS

| | | | |
|---|---|---|---|
| 6,110,411 | A | 8/2000 | Clausen et al. |
| 2002/0035233 | A1* | 3/2002 | Wang .................. H01L 23/293 528/99 |
| 2005/0014875 | A1* | 1/2005 | Knop .................... C08K 5/523 524/126 |
| 2007/0290410 | A1 | 12/2007 | Koo et al. |
| 2009/0076198 | A1* | 3/2009 | Giesenberg ............ C09D 7/48 524/82 |
| 2015/0002935 | A1 | 1/2015 | Lee et al. |
| 2015/0306838 | A1 | 10/2015 | Ito |
| 2015/0367571 | A1 | 12/2015 | Kanada |
| 2016/0348279 | A1 | 12/2016 | Ramappa et al. |
| 2017/0267815 | A1 | 9/2017 | Ramappa et al. |
| 2017/0298202 | A1 | 10/2017 | Ramappa et al. |

FOREIGN PATENT DOCUMENTS

| | | |
|---|---|---|
| JP | H0940876 A | 2/1997 |
| WO | 2009001850 A1 | 12/2008 |
| WO | 2015108544 A1 | 7/2015 |
| WO | 2015109135 A2 | 7/2015 |

* cited by examiner

ARTICLES WITH IMPROVED FLAME RETARDANCY AND/OR MELT DRIPPING PROPERTIES

CROSS-REFERENCE TO RELATED APPLICATIONS

This application claims priority to the provisional patent application filed Mar. 17, 2016 and assigned U.S. application Ser. No. 62/309,465, the disclosure of which is hereby incorporated by reference.

FIELD OF THE DISCLOSURE

The present disclosure relates to compositions, articles, and methods that provide injection molded parts, 3D printed parts, or extruded parts with improved flame retardancy or melt dripping properties.

BACKGROUND OF THE DISCLOSURE

Flame retardancy and degree of melt dripping are two important properties in articles such as injection molded, 3D printed, and extruded parts. Flame retardants are chemicals that resist the spread of fire and are used in, for example, thermoplastics, resins, injection molded parts, textiles, and coatings. Typically, flame retardants are halogenated (e.g., brominated) or phosphate based. However, these flame retardant and fire protection materials are generally inefficient or have negative impacts on the environment. For example, halogenated flame retardants, such as brominated flame retardants, are persistent, bio-accumulative, and toxic to both humans and the environment. Brominated flame retardants are suspected of causing negative neurobehavioral effects and endocrine disruption. Brominated flame retardants also release toxic gases which can cause more deaths than fire itself.

Non-halogenated flame retardants, such as phosphate based flame retardants, are generally non-toxic and environmentally friendly. However, non-halogenated flame retardant additives currently used in the market are less efficient than halogenated flame retardants. Generally, these phosphate based flame retardants require high loading (i.e., doses/volumes) which reduces efficacy. Such high doses may compromise the mechanical properties, thereby increasing susceptibility to failure of injection molded parts and other materials to which the phosphate based flame retardants are applied. Phosphate flame retardants also tend to leach out of the materials to the surface rendering the material vulnerable to fire.

For example, polymers may contain between 30% and 60% of phosphorus based flame retardant substances where only 15% of halogenated flame retardants may be sufficient to render the same effect. This higher percentage can compromise the structural integrity of the article and cause the properties of the article to deteriorate.

Melt dripping of plastics, injection molded parts, or 3D printed parts when exposed to flame or fire is also undesirable. Melt drips can cause grievous bodily injury because a hot, sticky, melted substance formed from the plastic can cause localized and extremely severe burns and these flammable parts can be a dangerous component within other devices or apparatus.

Many parts on, for example, automobiles, airplanes, building integration, electronic components, computers, batteries, or smart devices are now injection molded, 3D printed, or extruded. Flame retardancy of these parts is desirable.

Therefore, it is desirable to have injection molded parts, 3D printed parts, extruded parts, and other articles that show improved flame retardancy and that are capable of lowered melt dripping when exposed to flame.

BRIEF SUMMARY OF THE DISCLOSURE

The above objects are met by the compositions, articles, and methods disclosed herein.

A composition is provided in a first aspect. The composition includes a plurality of first resins and a plurality of second resins. The first resins include a first polymer functionalized with a first functional group. The second resins include a second polymer functionalized with a second functional group. The second functional group is different from and complementary to the first functional group. The first polymer and the second polymer are configured to form a third polymer via crosslinking upon exposure to flame. The first and second resins are configured to form an injected molded article, a 3D printed article, or a multilayer extruded article.

The third polymer may have a higher molecular weight than either the first polymer or the second polymer.

The first functional group and the second functional group may be selected from one or more of the following functional group combinations: amine and acid, amine and epoxide, amine and anhydride, amine and isocyanate, amine and aldehyde, amine and alkyl halide, amine and alkyl sulfonate, amine and thiol, epoxide and anhydride, epoxide and hydroxyl, and epoxide and acid.

In an instance, the first polymer can contain an epoxy functional group and the second polymer can contain a hydroxyl functional group or an amine functional group.

At least one of the first functional group and the second functional group can include a flame retardant. The flame retardant may be a phosphorus compound.

At least one of the first polymer or the second polymer may be a polyolefin. The polyolefin can include a water-releasing additive.

At least one of the first polymer or the second polymer may have a lower melting point than the other. The polymer having a lower melting point can contain a reactive crosslinker. The reactive crosslinker can include an epoxy modified 9,10-dihydro-9-oxy-10-phosphaphenanthrene-10-oxide (DOPO).

The first resins and the second resins may be different. In an instance, the first resin is polyethylene terephthalate (PET) and the second resin is nylon. The first resins and the second resins also may be the same. In an instance, the first resins and the second resins are nylon.

A plurality of third resins can be included in the composition. The third resins may be selected from the group consisting of acrylonitrile butadiene styrene (ABS), acrylonitrile butadiene styrene/polycarbonate (ABS/PC), engineered thermoplastic polyurethane (ETPU), high density polyethylene (HDPE), liquid crystal polymer (LCP), low density polyethylene (LDPE), linear low density polyethylene (LLDPE), nylon, polybutylene terephthalate (PBT), polycarbonate (PC), polycarbonate/polybutylene terephthalate (PC/PBT), polyetheretherketone (PEEK), polyether imide (PEI), polyethylene terephthalate (PET), copolyester, polylactic acid (PLA), poly(methyl methacrylate) (PMMA), polyoxymethylene, (POM), polypropylene, polyphenylene ether/high impact polystyrene (PPE/PS), polyphthalamide (PPA), polyphenylene sulfide (PPS), high impact polystyrene (PS), polysulfone (PSU), polyvinyl chloride (PVC), polyvinylidine fluoride (PVDF), styrene butadiene (SB), thermoplastic elastomer/thermoplastic vulcanizate (TPE/TPV), thermoplastic polyurethane elastomer (TPU), aramid, and combinations thereof.

The composition can further include a plurality of metallic inclusions.

The composition can further include a plurality of functionalized nanoparticles. In an instance, the first resins include nylon and silica nanoparticles functionalized with a hydroxyl functional group, and the second resins include nylon and silicon nanoparticles functionalized with an epoxy functional group.

An injection molded article, a 3D printed article, or a multilayer extruded article can be fabricated using any of the preceding embodiments of the composition.

A method is provided in a second aspect. A plurality of first resins that include a first polymer functionalized with a first functional group are provided. A plurality of second resins that include a second polymer functionalized with a second functional group are provided. The second functional group is different from and complementary to the first functional group. The first polymer and the second polymer are configured to form a third polymer via crosslinking upon exposure to flame. The first resins and the second resins are injection molded to form an object.

The first resins and the second resins can be injection molded simultaneously or sequentially.

A plurality of third resins can be added to the first resins and the second resins. The third resins may be selected from the group consisting of acrylonitrile butadiene styrene (ABS), acrylonitrile butadiene styrene/polycarbonate (ABS/PC), engineered thermoplastic polyurethane (ETPU), high density polyethylene (HDPE), liquid crystal polymer (LCP), low density polyethylene (LDPE), linear low density polyethylene (LLDPE), nylon, polybutylene terephthalate (PBT), polycarbonate (PC), polycarbonate/polybutylene terephthalate (PC/PBT), polyetheretherketone (PEEK), polyether imide (PEI), polyethylene terephthalate (PET), copolyester, polylactic acid (PLA), poly(methyl methacrylate) (PMMA), polyoxymethylene, (POM), polypropylene, polyphenylene ether/high impact polystyrene (PPE/PS), polyphthalamide (PPA), polyphenylene sulfide (PPS), high impact polystyrene (PS), polysulfone (PSU), polyvinyl chloride (PVC), polyvinylidine fluoride (PVDF), styrene butadiene (SB), thermoplastic elastomer/thermoplastic vulcanizate (TPE/TPV), thermoplastic polyurethane elastomer (TPU), aramid, and combinations thereof.

A plurality of particles can be added into the first resins and the second resins. The particles can include at least one of graphene, carbon, metallic or non-metallic carbonates, metallic or non-metallic oxides, glass particles, glass fibers, silicon, silica, or silicon oxide. The particles may be functionalized.

A method is provided in a third aspect. A plurality of first resins that include a first polymer functionalized with a first functional group are provided. A plurality of second resins that include a second polymer functionalized with a second functional group are provided. The second functional group is different from and complementary to the first functional group. The first polymer and the second polymer are configured to form a third polymer via crosslinking upon exposure to flame. The first resins and the second resins are 3D printed to form an object.

The first resins and the second resins can be 3D printed simultaneously or sequentially.

The first polymer and the second polymer may be the same and the first functional group and the second functional group may be different.

A plurality of third resins can be added to the first resins and the second resins. The third resins may be selected from the group consisting of acrylonitrile butadiene styrene (ABS), acrylonitrile butadiene styrene/polycarbonate (ABS/PC), engineered thermoplastic polyurethane (ETPU), high density polyethylene (HDPE), liquid crystal polymer (LCP), low density polyethylene (LDPE), linear low density polyethylene (LLDPE), nylon, polybutylene terephthalate (PBT), polycarbonate (PC), polycarbonate/polybutylene terephthalate (PC/PBT), polyetheretherketone (PEEK), polyether imide (PEI), polyethylene terephthalate (PET), copolyester, polylactic acid (PLA), poly(methyl methacrylate) (PMMA), polyoxymethylene, (POM), polypropylene, polyphenylene ether/high impact polystyrene (PPE/PS), polyphthalamide (PPA), polyphenylene sulfide (PPS), high impact polystyrene (PS), polysulfone (PSU), polyvinyl chloride (PVC), polyvinylidine fluoride (PVDF), styrene butadiene (SB), thermoplastic elastomer/thermoplastic vulcanizate (TPE/TPV), thermoplastic polyurethane elastomer (TPU), aramid, and combinations thereof.

A plurality of particles can be added into the first resins and the second resins. The particles can include at least one of graphene, carbon, metallic or non-metallic carbonates, metallic or non-metallic oxides, glass particles, glass fibers, silicon, silica, or silicon oxide. The particles may be functionalized.

The 3D printing can include fused deposition modeling (FDM). Using FDM, at least one of the first resins or the second resins may be a filament. In an instance, the first resins and the second resins are filaments.

The 3D printing can include selective laser sintering (SLS). Using SLS, at least one of the first resins or the second resins is a powder. In an instance, the first resins and the second resins are powders. The first resins and the second resins may be mixed together prior to the SLS. The first resins and the second resins also may be sequentially added on top of each other during the SLS.

A method is provided in a fourth aspect. A plurality of first resins that include a first polymer functionalized with a first functional group are provided. A plurality of second resins that include a second polymer functionalized with a second functional group are provided. The second functional group is different from and complementary to the first functional group. The first polymer and the second polymer are configured to form a third polymer via crosslinking upon exposure to flame. The first resins and the second resins are multilayer extruded to form an object. Melts of the first polymer and the second polymer are brought together on top of each other to form a multilayer film.

A plurality of third resins can be added to the first resins and the second resins. The third resins may be selected from the group consisting of acrylonitrile butadiene styrene (ABS), acrylonitrile butadiene styrene/polycarbonate (ABS/PC), engineered thermoplastic polyurethane (ETPU), high density polyethylene (HDPE), liquid crystal polymer (LCP), low density polyethylene (LDPE), linear low density polyethylene (LLDPE), nylon, polybutylene terephthalate (PBT), polycarbonate (PC), polycarbonate/polybutylene terephthalate (PC/PBT), polyetheretherketone (PEEK), polyether imide (PEI), polyethylene terephthalate (PET), copolyester, polylactic acid (PLA), poly(methyl methacrylate) (PMMA), polyoxymethylene, (POM), polypropylene, polyphenylene ether/high impact polystyrene (PPE/PS), polyphthalamide (PPA), polyphenylene sulfide (PPS), high impact polystyrene (PS), polysulfone (PSU), polyvinyl chloride (PVC), polyvinylidine fluoride (PVDF), styrene butadiene (SB), thermoplastic elastomer/thermoplastic vulcanizate (TPE/TPV), thermoplastic polyurethane elastomer (TPU), aramid, and combinations thereof.

A plurality of particles can be added into the first resins and the second resins. The particles can include at least one of graphene, carbon, metallic or non-metallic carbonates, metallic or non-metallic oxides, glass particles, glass fibers, silicon, silica, or silicon oxide. The particles may be functionalized.

Other aspects can be derived from the instant disclosure.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
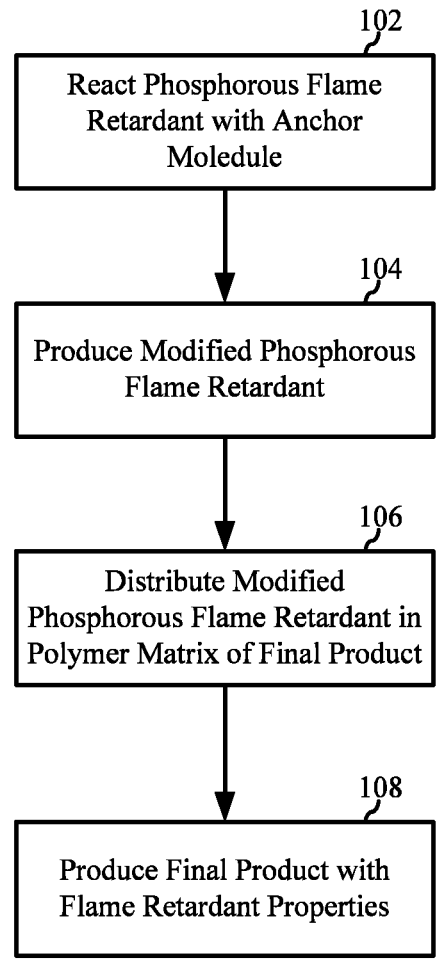
FIG. 1 illustrates a method of anchoring flame retardant molecules to a polymer matrix.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein, and that the terminology used herein is for the purpose of describing particular embodiments by way of example only and is not intended to be limiting of any claim. Similarly, unless specifically otherwise stated, any description as to a possible mechanism or mode of action or reason for improvement is meant to be illustrative only, and the disclosure herein is not to be constrained by the correctness or incorrectness of any such suggested mechanism or mode of action or reason for improvement. Throughout this text, it is recognized that the descriptions refer to compositions and methods of making and using the compositions. That is, where the disclosure describes and/or claims a feature or embodiment associated with a system or apparatus or a method of making or using a system or apparatus, it is appreciated that such a description and/or claim is intended to extend these features or embodiment to embodiments in each of these contexts (i.e., system, apparatus, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

In general, when a range is presented, all combinations of that range are disclosed. For example, 1 to 4 includes not only 1 to 4 but also 1 to 2, 1 to 3, 2 to 3, 2 to 4 and 3 to 4.

It is to be appreciated that certain features of the disclosure which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the disclosure that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Melt dripping and flammability of articles, such as injection molded components, extruded components, and 3D printed components, when exposed to flame can be problematic. For example, components made of polyethylene terephthalate (PET) and nylon can melt drip when aflame and cause grievous injuries. When these drops are flaming they can cause fires to spread, which may be a critical factor in obtaining a coveted V0 rating for flame retardancy in 3D printed, extruded, and injection molded components. Though flame retardant systems are used in PET and in nylon resins, none of them have been able to successfully reduce or stop melt dripping. Described herein are embodiments that can be used to reduce or eliminate melt drips when articles made of nylon and other polymeric materials encounter flame.

In one embodiment, crosslinking of a reactive component added to the molten resin (e.g., Nylon 6 that is molten above its melting temperature) before injection molding, extrusion, or printing is encouraged to form an interpenetrating network with the nylon matrix. The cross-linking enhances the viscosity of the material when aflame, potentially reducing the melt drips.

In one embodiment, Elvamide® nylon multipolymers from DuPont are added as an additive to the nylon melt during resin melting of formation. An epoxy crosslinker such as diglycidyl ether of polyethyleneoxide is used to crosslink the Elvamide® molecules. Other epoxy crosslinkers can include tris hydroxyl phenyl ethane, bisphenol-A diglycidyl ether, C8-C10-diglycidyl ether, cresyl diglycidyl ether, nonyl phenyl diglycidyl ether, phenyl diglycidyl ether, pentaerythritol polyglycidyl ether, or sorbitol polyglycidyl ether. In another embodiment, epoxy modified 9,10-dihydro-9-oxy-10-phosphaphenanthrene-10-oxide (DOPO) flame retardant molecules from Struktol can be used to modify some of the amines thereby imparting further flame retardancy and an ability for char formation. The DOPO may be a surface modifying additive used with an anchor. This embodiment is not limited to nylons but can also be applied to other thermoplastic resins or polymers such as PET by selecting appropriate reactive molecules. With Elvamide® nylon resin or similar nylon polymers that contain COOH and $NH_2$ functionalities, multifunctional crosslinkers (that may contain at least two functional groups) that may contain epoxy, anhydride, amine, isocyanate, or hydroxyl can be used to create crosslinked networks. Other groups or species also may be contained in the crosslinker and the crosslinkers are not limited merely to those examples herein.

The anchors or anchor molecules are generally oligomers or polymers that may be attached via covalent, electrostatic, or van der Waals interactions to the phosphorus based flame retardants. Typically, the anchor molecules are selected to be made of substantially similar molecules as the polymer matrix of the article, and/or compatible with the polymer matrix of the article. There are many commercial molecules that may be used as the anchor. For example, anhydride modified or amine modified molecules can be reacted with epoxy functionalized flame retardants Amine modified polymers, such as aminated silicones or amine modified polypropylene glycol may be used as an anchor. Other anchors include carboxyl modified anchors, and the P-H reactive group in DOPO makes it reactive with epoxy functional groups thereby allowing epoxy modified anchor molecules to be used as anchors. The anchors may also be multifunctional, enabling a reaction with a flame retardant and having other functional groups available for reacting with other entities.

In another embodiment, crosslinking can be induced between merging melt fronts such as those encountered in multi resin injection molded components, extruded components, or 3D printed components. For example, a part could be made by sequentially injecting two different polymer melts into a mold and the molten plastic streams that are injected can meet the previously deposited (injected) polymer melt. In 3D printing, two different filaments could be used to create a part, by sequentially layering the polymers on top of each other. The molten polymers thus meet each other when deposited on top of each other. These components are made by mixing two dissimilar materials in the molding process system to create components with two different materials joined together in many different shapes. This technique can be exploited to create cross-linked components. In one example, two streams of nylon polymer melts, one containing a nylon multipolymer resin made of thermoplastic polyamides, such as Elvamide®, and the other containing a bifunctional crosslinker such as diglycidyl ether of PEG, are brought together. When the melt fronts meet, the reactive molecules react with one another forming crosslinks (in this case it is via the reaction of amines in the Elvamide® molecule and the epoxy group in the crosslinker) where the melt fronts meet resulting in enhanced resistance to melt dripping in the case of a fire.

The techniques and embodiments discussed herein are not only applicable to injection molding but also to other process variations in polymer molding including blow molding, compression molding or rotational molding. The resin can be used by any of the above techniques and any of the platforms. The techniques and embodiments discussed herein are not only applicable to filament based 3D printing but also to other types of 3D printing including additive manufacturing processes of rapid prototyping (RP), direct digital manufacturing (DDM), layered manufacturing and specific 3D printing techniques like (but not restricted to) stereolithography (SLA), digital light processing (DLP), fused deposition modeling (FDM), selective laser sintering (SLS), selective laser melting (SLM), electronic beam melting (EBM), and laminated object manufacturing (LOM). The techniques and embodiments discussed herein also can be applicable to multilayer extrusion where in multiple polymer melts are brought together on top of each other to form multilayer films.

Melt dripping in articles such as molded parts, extruded parts, or 3D printed parts can be reduced or eliminated by creating a high molecular weight polymer via a crosslinking mechanism during exposure to flame. This high molecular weight polymer would have low melt viscosities and, hence, a lowered chance of dripping molten drops of polymer when exposed to flame. The resins and polymers could further be modified with flame retardants so that they show self-extinguishing behavior when exposed to flame.

The unfunctionalized polymers may have a molecular weight from about 2,000 Da to about 200,000 Da, including all values and ranges between. Upon exposure to flame, the molecular weight of the cross-linked system may be from about 50,000 Da to about 2,000,000 Da, including all values and ranges between. However, a cross-linked system may be considered as having an infinite molecular weight instead of a finite molecular weight. When crosslinks form and if it encompasses all the molecules in the mixture, one molecule is potentially formed. Usually, this crosslinking never proceeds to completion and a mix of very high molecular weight polymers are formed by crosslinking.

In an example, the cross-linked system has a melt viscosity from about 50 cps to about 20,000 cps, including all values to the 1 cps and ranges between. Viscosity increases with molecular weight. If all the polymer chains are connected via crosslinking, then the material will cease to be a thermoplastic that is capable of melting. Instead, the material turns into a thermoset that will char on exposure to flame instead of melting.

Embodiments disclosed herein can apply to synthetic resins and polymers such as nylons (polyamides), polyesters (both biodegradable and non-biodegradable), polyolefins (e.g., polypropylene, polyethylene), or styrene-based polymers (such as polystyrene and its copolymers). Embodiments disclosed herein also can apply to elastomeric resins and polymers, such as those from natural rubbers (e.g., polyisoprene) or synthetic rubbers (e.g., polyurethanes, polybutadiene, styrene-butadiene rubbers). Embodiments disclosed herein also can apply to natural materials such as those from animals such as silk, wool, or animal hair. Embodiments disclosed herein also can apply to aromatic materials (such as an aramid like Kevlar® or Nomex® manufactured by DuPont), or polyurethane. Embodiments disclosed herein also can apply to biodegradable materials such as polylactic acid (PLA), materials derived from proteins, or materials that are of plant origin and blends with synthetic resins. Embodiments disclosed herein can apply to other resins and polymers not specifically listed.

Crosslinking can be induced during the molding, extrusion, or 3D printing process by mixing two polymers containing complementary functional groups capable of reacting with each other. Crosslinking occurs when the produced polymer articles are exposed to flame. The crosslinking can be initiated at temperatures as low as about 120° C. when polyolefins are involved or as up to approximately about 350° C. to about 400° C. when high temperature polymers are involved. Temperatures ranges to initiate crosslinking can be between about 110° C. to about 450° C., including all values and ranges between, such as from about 150° C. to about 350° C.

A catalyst may be used to accelerate the reaction between complementary functional groups. In one such example, a polymer may contain excess of anhydride groups in one resin and epoxy groups in the other resin with an accelerator, such as an imidazole like Imicure® manufactured by Air Products and Chemicals, Inc. Other catalysts are possible.

Complementary functional groups include, but are not limited to, amine and acid, amine and epoxide, amine and anhydride, amine and isocyanate, amine and aldehyde, amine and alkyl halide, amine and alkyl sulfonate, amine and thiol, epoxide and anhydride, epoxide and hydroxyl, epoxide and acid, or other combinations that affect melt dripping.

In an embodiment, a molded, extruded, or printed component is constructed using an alternate pattern of two different resins. One has a polymer additive with functional group A (such as epoxy groups) and the other has a polymer additive with a functional group B (such as hydroxyls) on the surface (via grafting or topical treatment) or in the bulk (added during melt blending and processing). The surface predominantly refers to the polymer-air interface, whereas the bulk predominantly refers to the interior of the polymeric article. Distribution in the bulk or on the surface can be uniform or non-uniform. Some additives in the bulk can migrate to the surface. When such article is exposed to flame, the functional groups A and B react with each other in the heat elevating the molecular weight of the polymer network in the compounded resin immediately. This increased molecular weight will, in turn, increase viscosity thereby reducing melt drip.

Some of the functional groups are expected to be present at the surface of the resins or finished component to enhance the melt viscosity at the interfaces of the melt fronts. As a flame event results in sudden elevation of temperatures, the components are expected to be in a melt state almost instantaneously. This results in melting and comingling of the different polymers, which results in facile reaction between the functional groups in individual polymers and leads to increased melt viscosity. Thus, the depth at which the functional groups are located in a resin, molded, extruded, or printed component can affect melt dripping properties. This depth can be adjusted to affect melt dripping properties.

For a completely cross-linked system, the ratio of the functional groups A and B may be about 1:1. However, the ratio can be chosen such that more than about 10% of the A groups can react with B groups resulting in an increased molecular weight. In an example, about 20% to about 80% of the A groups reacted with corresponding B groups resulting in increased melt viscosity. Note that a completely cross-linked system in this instance refers to about 100%, but only rarely will the cross-linked system proceed to 100%.

In another embodiment, a resin or polymer of the same material or a different material can be fused together or processed together to produce a flame retardant resin or polymer. In an example, a polyethylene terephthalate (PET) resin or polymer, which is carrying an additive such as a multifunctional epoxy compound, can be compounded and molded with a nylon resin or polymer carrying either a multi-functional amine additive (such as a polyamine) or a polyhydroxy compound with a suitable catalyst, melt-blended into the nylon resin or polymer. When such resin or polymers come together (e.g., are bonded, bound, melted, contacted, etc.) and are exposed to flame/heat, they melt and fuse and the complementary functional groups react to create interpenetrating networks thereby increasing melt viscosity of the combined resin or polymer mass and reducing the dripping characteristics of the resin or polymer and hence the finished molded part, extruded part, or printed part.

In another embodiment, one of the resin or polymers containing complimentary functional groups is deposited, printed, extruded, or molded proximate another resin or polymer containing a complementary functional group capable of reacting with the first resin or polymer. When exposed to flame, both resins or polymers fuse together generating interfacial crosslinks capable of reducing melt viscosity.

In another embodiment, two resins or polymers are the same material with different functional groups. For example, a nylon resin or polymer that has an additive such as a multiamine polymer can be co-woven with another nylon resin or polymer containing a polyepoxy compound or a polyanhydride compound.

In another embodiment, resin or polymers could be processed, deposited, or printed in the same direction. This enables the resin or polymers to fuse along their length or at junction points when they are deposited orthogonal to each other.

In another embodiment, a third neutral resin or polymer that does not melt (such as particles of cotton or rayon) can be added as a minority component during the molding or printing process. The third resin or polymer can act as scaffolding around which functionalized resin or polymers can melt and form a high viscosity front against a flame front. The third resin or polymer may melt and has a higher melting temperature than either the first or second resin or polymers. Other examples of this third resin or polymer include thermoplastic polyetherimide (PEI) resins (e.g., ULTEM manufactured by SABIC), polyetheretherketone (PEEK), wool, hair, silk, or aramid (such Kevlar® or Nomex®).

In another embodiment, metallic additives are infused or added to act as heat sinks such that heat from the flame area can be carried to a distant location where melt fusing of the functional resin or polymers could occur, thus preventing further propagation of the flame front. These metallic additives may be copper, ferrous materials (such as steel wool), gold, silver, nickel, manganese, aluminum, or other metals or alloys that can act as heat sinks.

In another embodiment, the multi-functional additives could themselves contain flame retardant entities such as phosphates or phosphonates (e.g., an epoxy-containing phosphorus compound) which help form char on the surface exposed to flame, thus helping self-extinguish burning articles.

In another embodiment, chemical pairs that produce foam when combined can be added to neighboring resin or polymers such that upon melting and fusing, the gas forming or foam-forming components come together and form foam within the molten resin or polymers of the matrix making them insulating and preventing flame front propagation and dripping. In an example, sodium bicarbonate is impregnated in one resin or polymer and an acid (such as citric acid) is impregnated in the second resin or polymer. When the resin or polymers come together, the reaction leads to evolution of $CO_2$. In another example, isocyanate is impregnated in one resin or polymer and a water-releasing flame retardant (such as aluminum hydroxide ($Al(OH)_3$), also referred to as ATH) is impregnated in the second resin or polymer. When the water of hydration is released, isocyanate may react with water and release $CO_2$. Other chemical pairs also can produce foam when combined and these are merely examples. This technique is especially applicable in 3D printing where it is common to use two different polymer streams or polymer melts (using two different filaments or jets) to create structures that support each other and add functionality to the print.

In another embodiment, the two complimentary resin or polymers or three complementary resin or polymer/inert resin or polymer combination (two complimentary resin or polymers along with one or more inert resin or polymers) can be converted into a molded component or printed using techniques known in art. In an example, the three resin or polymer combination resin or finished component is made by using functionalized-polyester, functionalized-nylon, and a metallic additive or functionalized-polyester, functionalized-nylon, or a polypropylene resin or polymer.

Complimentary resin or polymers are those that have reactive groups which can react to link the resin or polymers. Inert resin or polymers are substantially devoid of such reactive groups.

In another embodiment, a water releasing additive (such as aluminum hydroxide (ATH)) can be added to a resin or polymer made of polyolefin. As the ATH decomposition temperature is lower than the processing temperature of nylon or PET, it may only be used with lower melting polymers such as polyolefins. When such ATH-containing resin or polymers (e.g., polyolefins) are processed together with either nylon or PET, the ATH-containing resin or polymers provide a source of water during flame propagation thereby quenching the fire and reducing the heat. Borate and zinc oxide based flame retardants, magnesium hydroxide, magnesium hydroxide sulfate hydrate, magnesium carbonate subhydrate, calcium hydroxide, calcium sulfate dehydrate, and magnesium phosphate octahydrate are examples of materials that also can provide a source of water during flame propagation. Depending on the application and other flame retardants used, the added range of water releasing additive could be from 1 PHR to 75 PHR, including all values and ranges between.

In another embodiment, a nitrogen-containing synergist such as a melamine compound can be melt blended in one resin or polymer and a molecule containing epoxy groups in the other resin or polymer. This nitrogen-containing synergist is an additive in a resin or polymer that contains nitrogen. When these two resins or polymers melt and fuse in the presence of a flame, a reaction is initiated between melamine compound and epoxy thereby creating a cross-linked network that behaves like a thermoset. As the melting temperature of melamine is 350° C., no reaction is expected to occur with melamine during the traditional processing temperatures used for producing nylon or PET resin or polymers (<300° C.). This network should reduce melt dripping and help self-extinguish the flame. In another embodiment the melamine additive could be used in conjunction with an additive containing phosphorus, as the nitrogen containing molecules synergistically aid the flame retardant properties of phosphorus containing molecules. The cross-linked network is a large molecular weight polymer with low melt viscosity. The additional bonds between chains formed during crosslinking have to be broken before stepwise degradation of chain occurs during pyrolysis. Crosslinking also increases melt viscosity of the molten polymer in the combustion zone, thereby lowering the rate of transport of the combustible pyrolysis products (flammable gases) to the flame. While melamine is discussed, urea, guanidine carbonate, melamine cyanurate, melamine formaldehyde, melamine phosphate, melamine poly, or other materials also may be used.

In another embodiment, crosslinking can be induced between merging melt fronts such as those encountered in bicomponent resins or polymers. These resin or polymers are made by mixing two dissimilar materials in the molding or printing process to create resin or polymers with two different materials joined together in different shapes. Both resins or polymers are functionalized with functional groups that are complementary. This technique can be exploited to create cross-linked resin or polymers. In one example, two streams of PET polymer melts, one containing a nylon resin, such as Elvamide® and the other containing a bifunctional crosslinker such as diglycidyl ether of polyethylene glycol (PEG) are brought together. When the melt fronts meet, the reactive molecules react with one another forming crosslinks where the melt fronts meet resulting in enhanced resistance to melt dripping in the case of a fire. The bicomponent resin or polymers could also be made of two different melt streams. For example one may be nylon and the other may be PET. The PET part can contain a polyanhydride or a bifunctional crosslinker such as diglycidyl ether of PEG while the nylon part can contain no additives or low molecular weight nylon analogues such as hexamethylenetetramine (HMTA), triethylenetetramine (TETA), tetraethylenepentamine (TEPA), or pentaethylenehexamine (PEHA). When the PET and nylon melts are brought together, the crosslinking occurs between the amines and the anhydrides (or the epoxy) creating an interpenetrating network that inhibits melt dripping.

In another embodiment, a two or multilayer resin/polymer composite or dual/multiresin or polymer layered component is used. One of the layers is a resin or polymer that melts at a lower temperature and this melt envelopes the second resin or polymer (a polyamide) and/or the whole component. The low melting point resin or polymer has a reactive crosslinker such as epoxy modified 9,10-dihydro-9-oxy-10-phospha-phenanthrene-10-oxide (DOPO) that has been melt blended during the production of the resin or polymer. When the lower melting point resin or polymer melts during a flame/fire event and envelops the other resin or polymers/finished molded, extruded, or printed part, the reactive flame retardant then crosslinks the melt fronts of the nylon resins or polymers (exposed to the same flame/fire). This crosslinker then drives the crosslinking of the two resins or polymers.

In another embodiment, particles bearing complimentary functional groups can be added to the resin or polymers during melt processing. For example, surface modified silica or silicon nanoparticles could be added during resin or polymer spinning A first nylon resin or polymer may contain silica nanoparticles that have been modified with hydroxyl functional groups and a second nylon resin or polymer may contain silicon nanoparticles surface modified with epoxy functional groups. These two resin or polymers are then molded, extruded, or printed together in various form factors and patterns known in the art. When such a molded, extruded, or printed part is exposed to flame, a reaction in the melt phase is initiated between the complementary functional groups present on the surface of the silicon nanoparticles thereby creating a cross-linked network of particles which should enhance the melt viscosity and reduce dripping.

Besides silica or silicon, these particles also may be $TiO_2$, precipitated calcium carbonate (PCC), ground calcium carbonate (GCC), fibrous fillers such as carbon resin or polymers, glass fibers, graphene, carbon black, clay, mineral fillers, metallic particles such as aluminum, ferrous particles, or other materials with complementary functional groups. The particle loadings can be in the range of less than about 1% for high aspect ratio fillers such as graphene and clay to from about 40% to about 50% loading for fillers such as silica, glass resin or polymers, and carbon black.

Particles with functional additives disclosed herein can be added at from approximately 1% to 50% weight of the resin or polymer, including all values and ranges between. Reactive molecules disclosed herein can be added at from approximately 1% to 10% weight of the polymer or resin or polymer, including all values and ranges between.

Also disclosed are compositions, articles, and methods related to benign and non-toxic flame retardants in which the flame retardant molecules or particles are anchored to a polymer matrix of an article or finished product, and are stably and uniformly distributed therein. In an aspect, phosphorus containing chemicals are effective flame retardants and are used to replace brominated compounds due to the environmental concerns associated with the brominated compounds.

The compositions may include one or more phosphorous based flame retardant molecules reacted with one or more anchors, such as, oligomeric or polymeric chains having a reactive functional group, such as an epoxy functional group, a hydroxyl functional group, an anhydride functional group, a carboxyl functional group, a sulfhydryl functional group, an ester functional group, an ether functional group, and other functional groups of the type, or combinations thereof, contained therein, forming a modified flame retardant or conjugate. The modified flame retardant may be incorporated into a polymer matrix, via bonding or physical entanglement, and used to impart flame retardant properties to final products, such as paints, textiles, coatings, and other articles.

A method of anchoring flame retardant molecules to a polymer matrix is described with reference to FIG. 1. As illustrated, phosphorous based flame retardants are reacted with anchors, for example, oligomeric or polymeric chains, containing functional groups that are reactive towards the flame retardants, illustrated as block 102. This reaction results in flame retardants that are modified with polymer chains or anchors, illustrated as block 104. The modified flame retardants may then be mixed with a polymer matrix of an article, such as a thermoplastic, textile, and/or coating, illustrated as block 106, to provide a final product with flame retardant properties, illustrated as block 108. The anchors allow for increased dispersion of the flame retardant within the polymer matrix of the article, and also enable high loadings, for example up to about 40%, without adversely impacting the mechanical properties of the article due to bonding or physical entanglement of the anchor or tail with the polymer matrix of the article.

For example, a phosphorous flame retardant, DOPO can be reacted with anchors containing an epoxy functional group using amines as catalysts. A phosphorous flame retardant, such as DOPO, modified with epoxy functional groups can be reacted with molecules containing amine groups or anhydride groups. A phosphorous flame retardant, such as DOPO, can be hydrolized to provide a hydroxyl functionality which can be further reacted with an isocyanate functional group. Isocyanates used to make polyurethane have two or more isocyanate groups on each molecule. The most commonly used isocyanates are the aromatic diisocyanates, toluene diisocyanate (TDI), and methylene diphenyl diisocyanate (MDI) Similarly, a phosphorous flame retardant, 1,3-phenylene methylphosphonate (FYROL PMP), can be reacted with isocyanate groups and effectively incorporated in foams made of urethane polymers.

Figure 2:
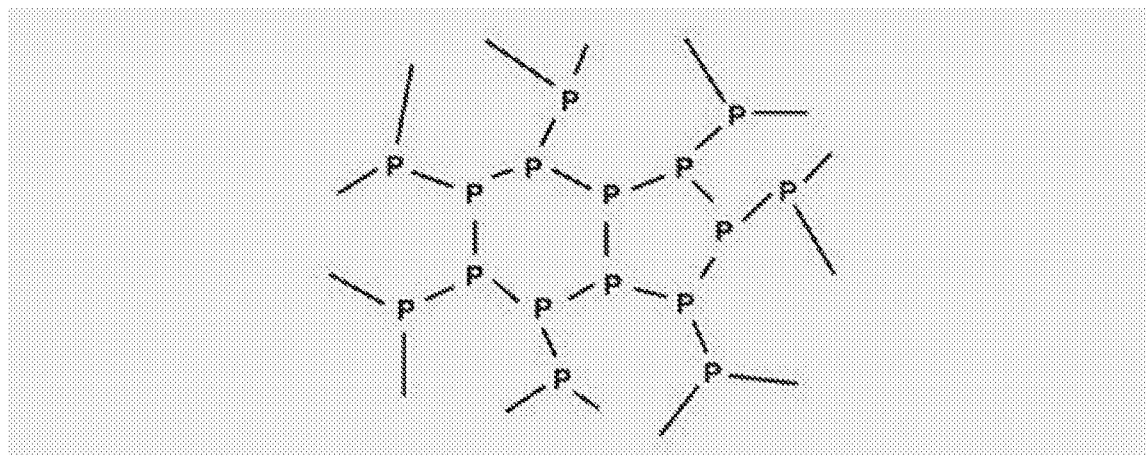
FIG. 2 illustrates the structure of red phosphorous.
Figure 3:
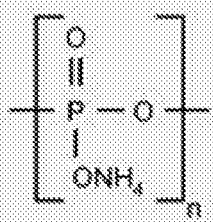
FIG. 3 illustrates the structure of ammonium polyphosphate.
Figure 4:
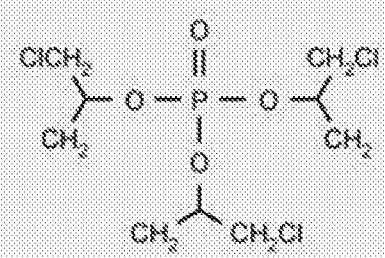
FIG. 4 illustrates the structure of trischloropropyl phosphate (TCCP)
Figure 5:
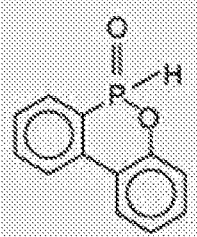
FIG. 5 illustrates the structure of 9,10-dihydro-9-oxa-10-phosphaphenanthrene-10-oxide (DOPO)
Figure 6:
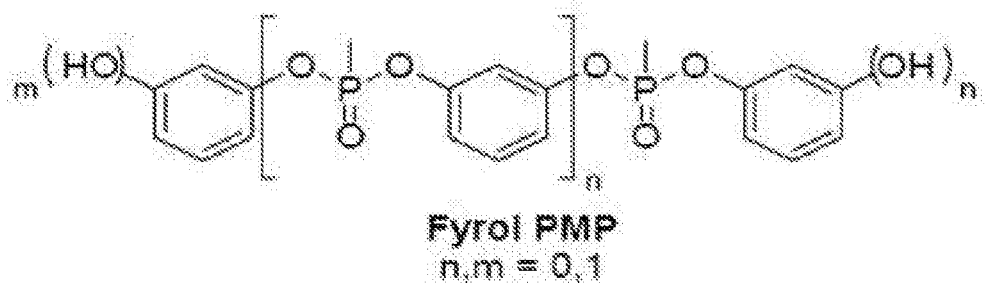
FIG. 6 illustrates the structure of 1,3-phenylene methylphosphonate.

Some examples of phosphorous based flame retardants that may be used include, for example, but are not limited to, red phosphorous (illustrated in FIG. 2), ammonium polyphosphate (illustrated in FIG. 3), trischloropropyl phosphate (TCCP) (illustrated in FIG. 4), DOPO (illustrated in FIG. 5), and FYROL PMP (illustrated in FIG. 6), other phosphorous based flame retardants, and combinations thereof.

The aliphatic flame retardants with suitable anchors may be used with polymer matrices, for example, including, but not limited to, aliphatic polymers such as polyethylene, polypropylene, acrylates, elastomers, aliphatic polyesters and polyurethanes, acetals (polyoxymethylene), polyamides, and combinations thereof as well as other polymers disclosed herein. Similarly, aromatic flame retardants with suitable anchors may be used with polymer matrices, for example, including, but not limited to, polyesters, styrenic polymers such as polystyrene, ABS, styrene butadiene rubbers and combinations thereof as well as other polymers disclosed herein.

Figure 7:
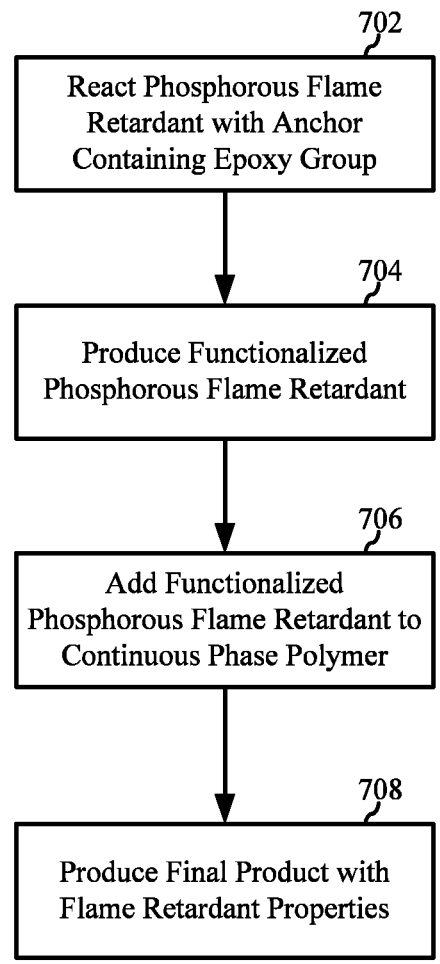
FIG. 7 illustrates a method of reacting a flame retardant with an anchor containing an epoxy functional group.
Figure 8:
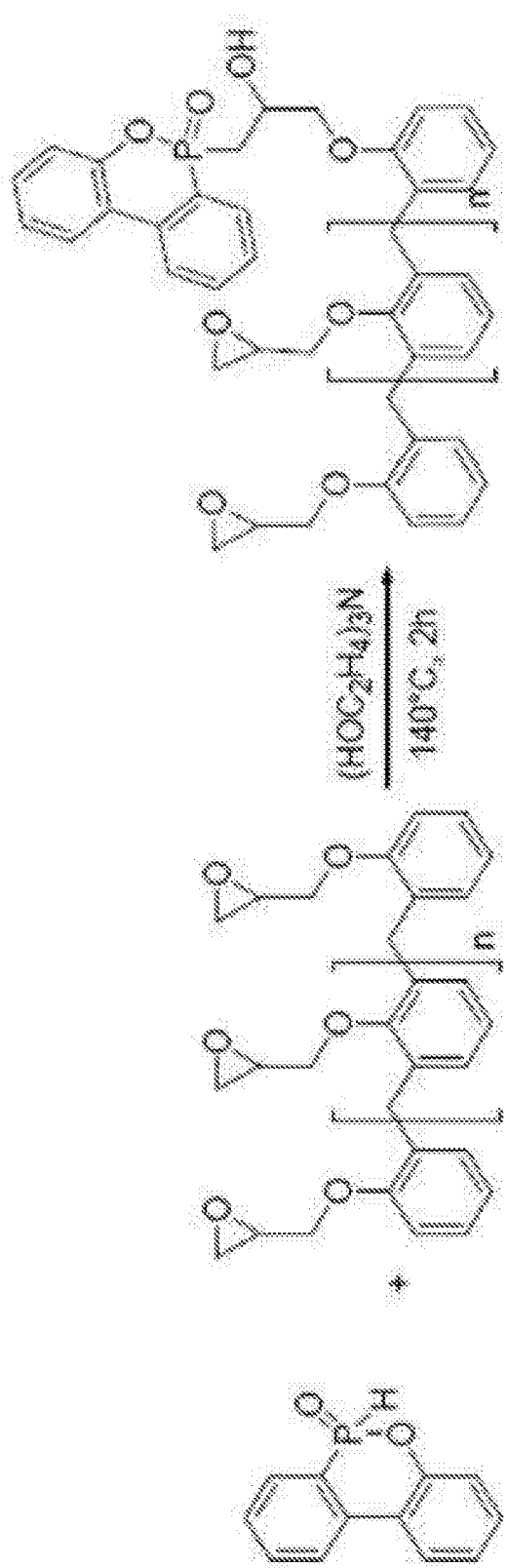
FIG. 8 illustrates a representative reaction of DOPO with an epoxy functional group.

A method of reacting a flame retardant with an anchor containing an epoxy functional group is described with reference to FIG. 7. As illustrated, a phosphorous flame retardant, such as DOPO, is reacted with an anchor containing an epoxy functional group using amines as catalysts, illustrated as block 702, to produce a functionalized phosphorous flame retardant, illustrated as block 704. For example, DOPO (9,10-dihydro-9-oxa-10-phosphaphenanthrene-10-oxide (3,4,5,6-dibenzo-1,2-oxaphosphane-2-oxide)), a reactive molecule containing 14.3% by weight phosphorus may be reacted with epoxy modified polypropylene glycol diglycidyl ether using an amine as a catalyst. A representative reaction of DOPO with an epoxy functional group is illustrated in FIG. 8. Typical reactions include dry-blending stoichiometric ratios of DOPO with polypropylene glycol diglycidyl at high temperatures or reacting them at high temperatures in high boiling point solvents. The functionalized phosphorous flame retardant, such as functionalized DOPO-polypropylene glycol diglycidyl ether, may then be added to a continuous phase polymer, illustrated as block 706, and used to form typical products and articles, illustrated as block 708.

Figure 9:
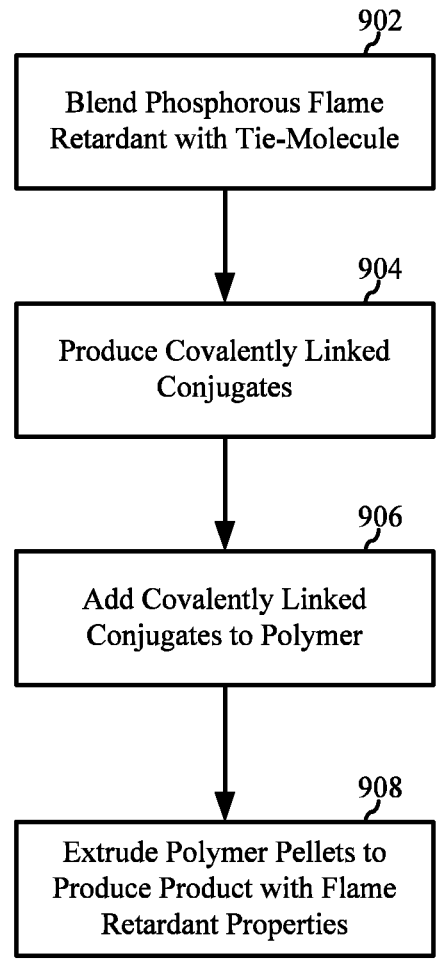
FIG. 9 illustrates a method of reacting a flame retardant with a tie-molecule.

A tie-molecule may also be used as an anchor. A tie molecule can make two dissimilar materials compatible or can mix two dissimilar materials via a covalent bond or by physical means (like a soap mixing oil and water). A method of reacting a flame retardant with a tie-molecule is described with reference to FIG. 9. As illustrated, a tie-molecule, such as a DuPont Fusabond® material (which includes modified ethylene acrylate carbon monoxide terpolymers, ethylene vinyl acetates (EVAs), polyethylenes, metallocene polyethylenes, ethylene propylene rubbers and polypropylenes) is blended with a phosphorus flame retardant, illustrated as block 902. The tie-molecules can be blended, in master batches (e.g., a concentrate), with the phosphorus flame retardants in an extruder at high temperature, optionally with a catalyst, to create covalently linked conjugates, illustrated as block 904. The conjugated phosphorus molecules can then be metered into traditional polymer processing equipment at the desired level in master batches to achieve a desired property, illustrated as block 906, and pellets can be extruded by mixing the phosphorus-polymer conjugates with small amounts of the polymer matrix to yield a highly concentrated anchored flame retardant material, illustrated as block 908.

In an embodiment, nanoparticles are combined with phosphorus containing materials to produce flame retardant materials. For example, graphene nanoparticles have a large surface area, and can be combined with phosphorus compounds to produce phosphorous-modified graphene. Other nanoparticles may also be modified or functionalized in a similar manner, including but not limited to, graphite, graphene, graphene oxide, and other nanoparticles.

The compositions may include one or more phosphorous based flame retardant molecules reacted with one or more nanoparticles, such as, graphene, having a reactive functional group, such as an epoxy functional group, a hydroxyl functional group, or combinations thereof, contained therein, forming a functionalized nanoparticle. The functionalized nanoparticle may be incorporated into a polymer matrix and used to impart flame retardant properties to final products, such as molded parts, extruded parts, printed components or parts, paints, coatings, and other articles.

Traditionally, phosphorus based flame retardants are added to a polymer in the range of about 20% to about 60% by weight of the polymer. However, this amount can cause interference with the inherent properties of the polymer, such as the mechanical strength, glass transition temperature (Tg), and water uptake.

In order to address this issue, a functionalized or non-functionalized graphene is used to produce a flame resistant molded article. This produces an effective flame retardant that can be used at low loading, for example as low as about 1%, that maintains and can even enhance the properties of the polymer article. Graphene particles have high strength and surface area, and can achieve a percolation threshold at lower loading dosages due to the smaller size of the graphene particles.

Figure 10:
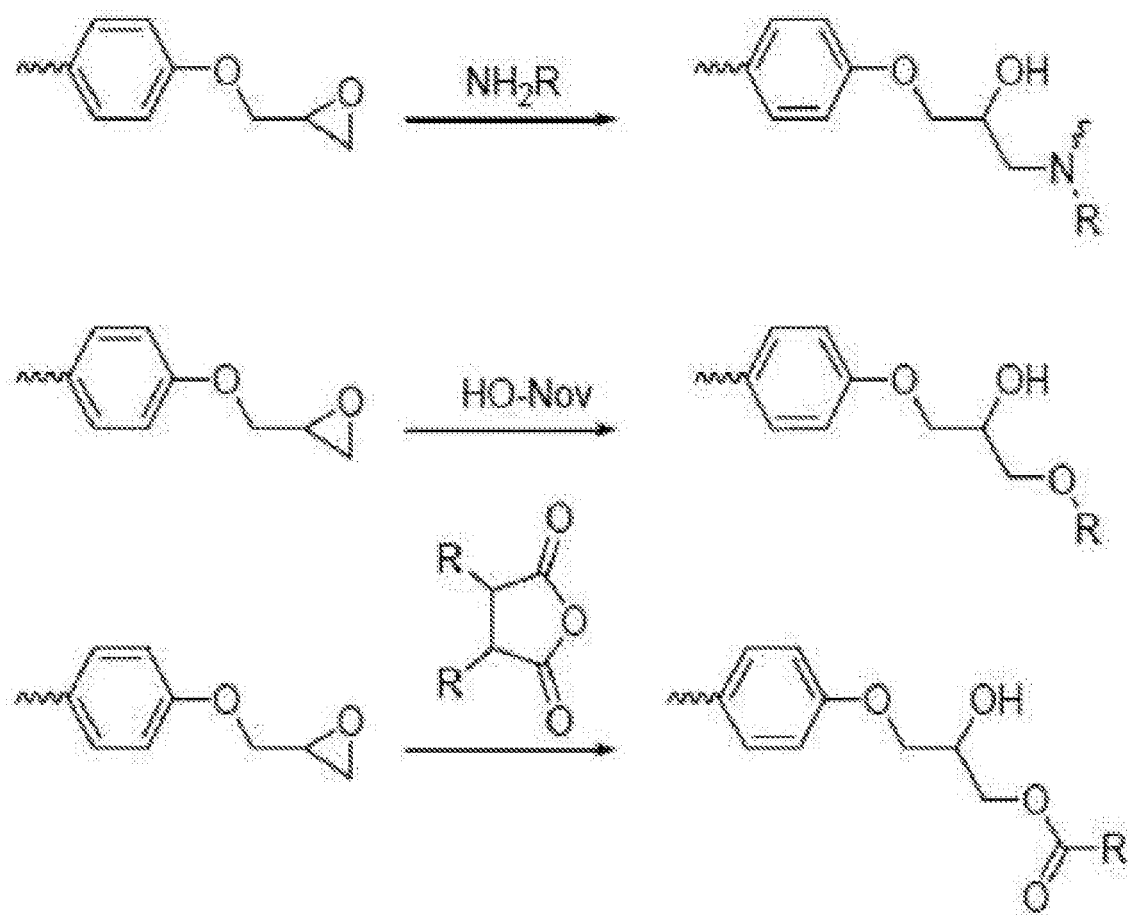
FIG. 10 is an example of an amine-epoxy reaction.

In an example, unreduced graphene, containing epoxy and hydroxyl (OH) functional groups, functionalized with phosphorus containing materials may be used as an inclusion phase in flame retardant, composite materials that retain their inherent physical properties. The presence of epoxy groups allows for reactions with amines, anhydrides and phenol (hydroxyl) to covalently immobilize various molecules, including flame retardant molecules, containing these groups. A schematic of exemplary reactions is illustrated in FIG. 10.

Figure 11:
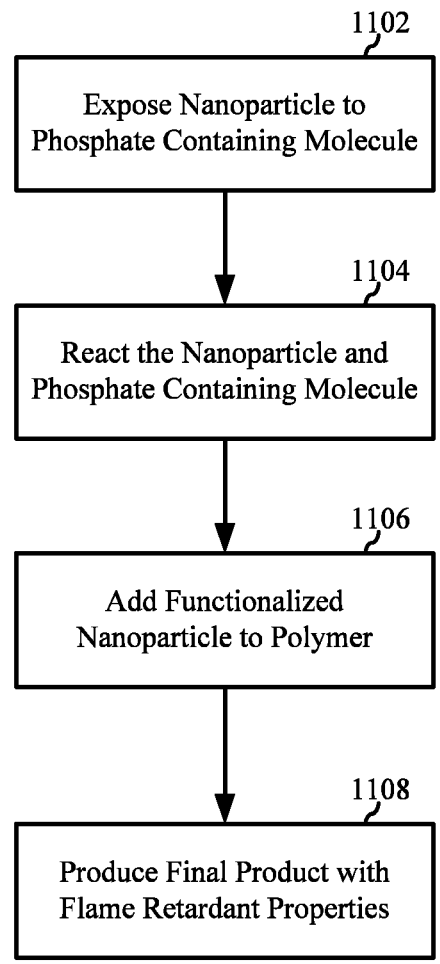
FIG. 11 is a method of functionalization of nanoparticles.

A method of functionalization of nanoparticles is described with reference to FIG. 11. In general, the nanoparticles are exposed to phosphate containing molecules, illustrated as block 1102. The nanoparticles and phosphate containing molecules are reacted, for example, at high temperature, illustrated as block 1104, forming a functionalized nanoparticle. The functionalized nanoparticle may then be added to a polymer matrix, illustrated as block 1106, and used to create a final product with flame retardant properties, illustrated as block 1108.

In an example, phosphate functionalization is performed by exposing nanoparticles, for example, graphene or graphene oxide, to phosphoric acid or methylphosphonic acid under nonoxidizing high temperature environments. Typically, phosphoric acid or methylphosphonic acid solutions in water are mixed with the particles at about 0.1% to about 10% by weight, more particularly about 1% by weight, and dried in an oven to remove water at about 110° C. The mixture is placed in a furnace at about 800° C. to facilitate reaction between graphene and phosphate or phosphonate functionalities. Typically, the unbound phosphate or phosphonate moieties are dislodged from the graphene surface at high temperatures (for example, greater than about 700° C.) while carbon bound phosphorus remains stable.

In one example, phosphate functionalized graphite stack particles are disclosed. In this example, the phosphate functionalized graphite stack particles are produced by adding a 10% polyphosphoric acid to graphene particles at about 1% by weight. The mixture is enclosed in a glass container and sealed and placed in a furnace at about 500° C. The atmosphere in the furnace may be controlled to be non-oxidizing by using argon. After about four hours, the particle slurry is washed in water to remove unreacted phosphoric acid and re-suspended in water or dried for further use.

Figure 12:
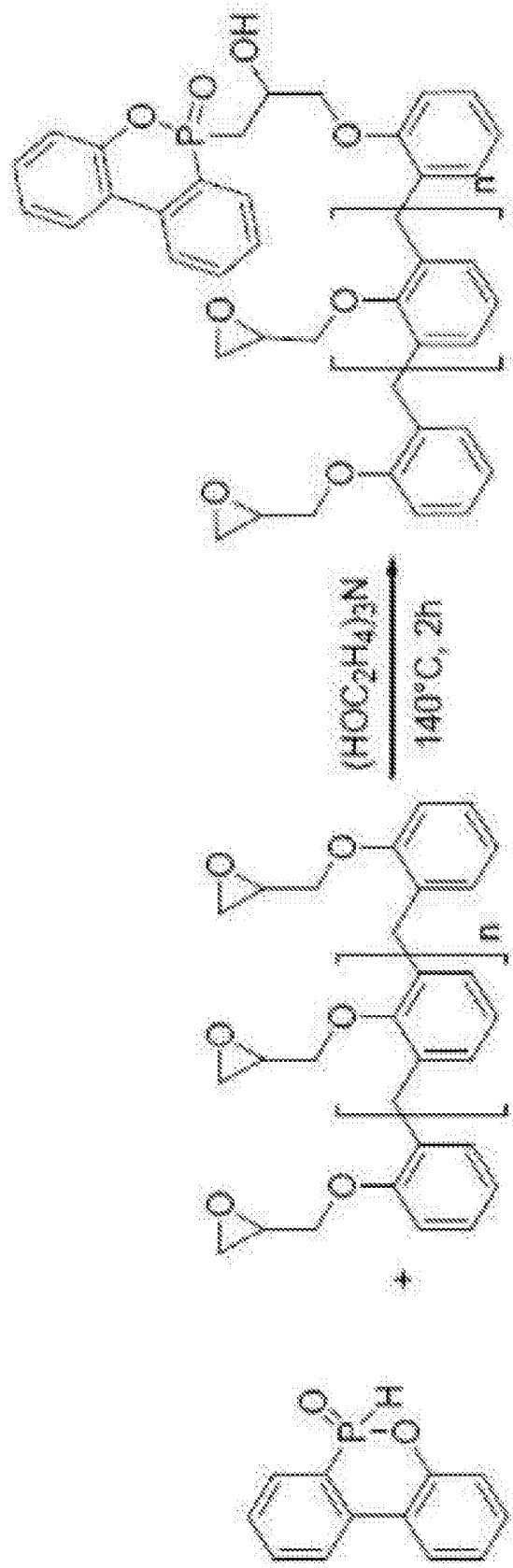
FIG. 12 is a representative reaction of DOPO with an epoxy functional group.

In another example, graphene functionalized with DOPO is disclosed. In this example, DOPO, a reactive molecule containing about 14.3% by weight phosphorus is used as a functionalizing agent to impart graphene with a flame retardant property. A representative reaction of DOPO with an epoxy functional group is illustrated in FIG. 12.

Typical reactions include either dry-blending stoichiometric ratio of DOPO with graphene at high temperatures or reacting them at high temperatures in high boiling point solvents. The functionalized DOPO-graphene can be added to a continuous phase polymer and used to form typical products.

In another example, graphene functionalized with aminomethylphosphonic acid (AMPA) is disclosed. In this example, AMPA provides another way to functionalize epoxy groups on un-reduced graphene with the phosphonate functionality. The amine-epoxy reaction (examples illustrated in FIG. 10) is well known and carried out in dry form or in aprotic solvent conditions at elevated temperatures.

In another example, graphene functionalized with methylphosphonic acid is disclosed. Typically, methylphosphonic acid solutions in water are intimately mixed (e.g., mixed vigorously) with the particles at about 0.1% to 10% by weight, more particularly about 1% by weight, and dried to remove water in an oven at about 110° C. The mixture is placed in a furnace at about 800° C. to facilitate reaction between graphene and phosphate or phosphonate functionalities. The unbound phosphate or phosphonate moieties are dislodged from the graphene surface at high temperatures (for example, greater than about 700° C.) while carbon bound phosphorus remains stable.

In another example, graphene functionalized with FYROL PMP polymer is disclosed. FYROL PMP (1,3, phenylene methylphosphonate) is a bifunctional crosslinking agent used to cure epoxy compounds, which imparts phosphonate functionality to the epoxy backbone cross-linked structure. In an embodiment, amine functionalized graphene is mixed with an about 1% solution of FYROL PMP in methyl ethyl ketone (MEK) or acetone and sonicated for about 15 minutes. A small amount of di-epoxy cross-linker, such as, PEG-diglycidylether, diglycidylether, and/or bisphenol A, is added at about 1% by weight of the graphene. The reaction is allowed to proceed in the presence of a base catalyst, such as, 2-methylimidazole. The reaction results in one or more of the amines being functionalized with an epoxy crosslinker, and the other end of the cross-linker being reacted with the phosphonate group of PMP. The unreacted PMP and epoxy crosslinkers are washed out with MEK and acetone, and the graphene is recovered and dried. The amine-epoxy and phosphonate-epoxy reaction results in FYROL PMP being bound to graphene.

In another example, graphene functionalized with vinylphosphonic acid (VPA) and its dimethylester (VPADME) is disclosed. VPA or VPADME may be used as a compatibilizer between graphene and a polymer matrix. In this example, the graphene is functionalized with amine polymers, such as, polyvinylamine and/or chitosan, to include one or more primary amine functional groups. There is a strong affinity between phosphate functionalities and amine groups. The amine modified graphene is further modified with phosphorous groups of VPA or/and VPADME by suspending the amine-graphene in VPA or VPADME solutions. VPA and VPADME impart flame retardant properties to polymers containing them owing to very high phosphorus content (for example, VPA includes about 29% by weight phosphorus and VPADME includes about 23% by weight phosphorus).

In yet another example, graphene functionalized with epoxy functionalized phosphonates is disclosed. Epoxy functionalized phosphonate containing compounds, such as, epoxydimthylphosphonate, can be used to functionalize amine functionalized graphene. Chitosan modified and/or polyvinylamine modified graphene may be reacted with a 1% solution of epoxydimthylphosphonate in an aprotic solvent at elevated temperatures to produce phosphonate functionalized graphene.

In an embodiment, macromolecules or anchor molecules are deposited onto the surface of the nanoparticles, such as, exfoliated graphite, graphene, and/or graphene oxide, to enable the nanoparticles to be mixed in suitable polymer matrices without significant agglomeration. This allows the particles to be incorporated into a polymer matrix in a homogeneous fashion.

In general, polymer composites use the concept of master-batches in which a very high concentration of an additive is mixed with a small quantity of the polymer to create particles that are easily miscible with the polymer matrix when added during polymer processing. However, the highly adhesive nature of the intermolecular forces between nanoparticles makes it difficult to prevent stacking of such particles. The depositing of the macromolecules onto the surface of the nanoparticles allows the nanoparticles to be incorporated into a polymer matrix while avoiding stacking concerns.

In an embodiment, conjugates and bio-conjugates of graphene and macromolecules may be deposited onto the surface of the nanoparticles. The resultant conjugated-nanoparticles have a hydrophobic characteristics that results in minimal agglomeration once incorporated in suitable polymer matrices. In other embodiments, the surface functionalization using the conjugates can be performed to provide cationic groups, hydrophilic groups, and/or groups that can chelate specific metals to make them miscible in a polymer/metal composite system. The macromolecule-graphene conjugates may be dispersed in a continuous phase polymer. These multi-component composite structures result in superior properties when compared to the individual phases alone, including, but not limited to, increased conductivity, strength, toughness, and elasticity.

Figure 13:
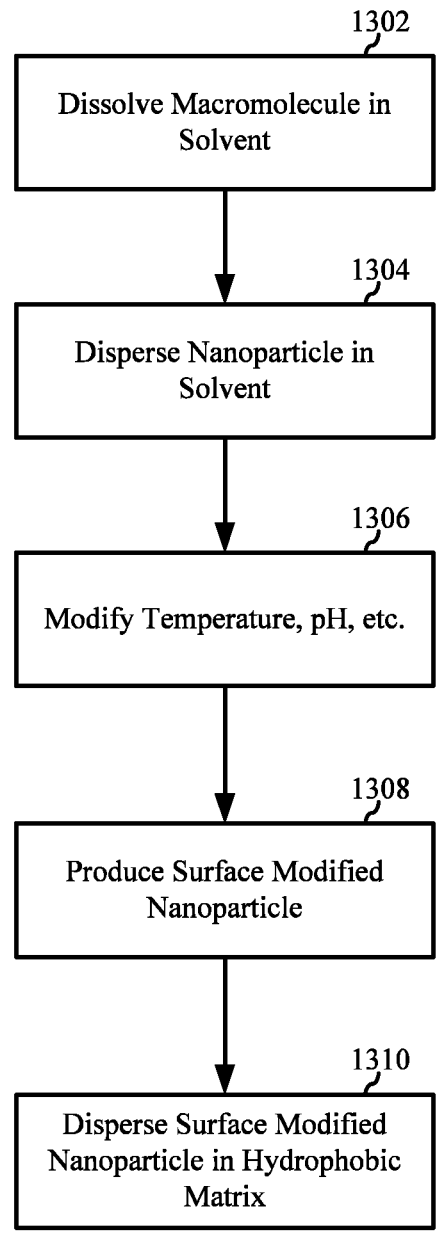
FIG. 13 is a method of modification of nanoparticles using macromolecules that have variable solubility in a given solvent.

A method of modification of nanoparticles using macromolecules that have variable solubility in a given solvent is described with reference to FIG. 13. The macromolecule is dissolved in a solvent (such as water, acetone, ethanol, methanol, dimethyl sulfoxide (DMSO), dimethylformamide (DMF), etc.) under allowable conditions, illustrated as block 1302. The conditions that determine solubility include, but are not limited to, temperature, pH, etc. The nanoparticle is homogeneously dispersed in the solvent, illustrated as block 1304. The conditions are then modified to decrease solubility of the macromolecule, illustrated as block 1306, resulting in a surface modified nanoparticle, illustrated as block 1308.

The macromolecule modified-nanoparticles can be readily dispersed in hydrophobic matrices, illustrated as block 1310. Using techniques known in the art, modified-nanoparticles can be used as an inclusion phase when dispersed in hydrophobic solvents. The nanoparticles retain their superior physical and chemical properties, imparting them to the composite structure. Such properties include enhanced physical and electric properties.

In an example, dispersed hydrophilic nanoparticles can be surface modified in water with a monolayer of styrene maleimide (SMAI) using a pH change in the solution. As SMAI polymers are water soluble at high pH and insoluble below their isoelectric point, the pH change can be used to deposit SMAI on water dispersible nanoparticles. Upon deposition, the particles with the individual SMAI coating agglomerate and can be filtered from the solution. Such agglomerates do not revert back to stacked nanosheets as the SMAI layer acts as a spacer. When such hydrophobically modified particles are added to polymer matrices, dispersability becomes easier and the hydrophobic styrene part of SMAI enables good interfacial strength with the hydrophobic matrix (particularly with matrices containing styrenic polymers such as polystyrene, acrylonitrile butadiene styrene, styrene butadiene, etc.).

In another example, zein, a hydrophobic non-edible protein from soy can be used to modify the surfaces of hydrophilic nanoparticles. Zein is soluble in high pH while insoluble in pH below its isoelectric point. Zein leaves a hydrophobic layer on the surface of the nanoparticles leading to easy dispersability in a hydrophobic matrix. Other proteins exhibiting isoelectric point based solubility such as casein may also be used.

In another example, chitosan, a naturally occurring polymer found in the shells of sea animals, can be used to modify the surfaces of nanoparticles. Chitosan can be dissolved in an acidic aqueous solution, and precipitates in alkaline aqueous solutions. Nano particles dispersed in chitosan can then be coated with a thin precipitated layer of chitosan by simply changing the pH of the solution to an alkaline one.

In another example, a series of polymers developed by derivatizing polyvinylamine using epoxidized reactive side chains can be used to modify the surfaces of nanoparticles. The backbone polymer is soluble in water but the solubility can be altered by modifying the primary amine groups along the backbone. The altered solubility can be modulated by pH change or by temperature. By grafting hydrophobic sidechains, the solubility limit can be tuned as a function of pH while adding sidechains, which have temperature sensitive solubility (such as LCST polymer, e.g., PEO, PPO and their copolymers). By changing the solubility of these polymers, the polymers can be precipitated onto graphene oxide particles in water, thereby imparting different surface functionalities. The reactive side chains may be chosen to be compatible with the polymer matrix to which modified graphene oxide particles are added.

Other examples may include the use of amine modified graphene or graphene oxide to functionalize with phosphate groups by reactions with phosphoric acid or polyphosphoric acid. The inherent epoxy groups present on the surface of graphene oxide may also be used to react with epoxy-reactive phosphate containing molecules such as DOPO.

In an embodiment, compositions and methods of making porous nanoparticles imbibed with flame retardant molecules are disclosed. The problem of incorporation of flame retardants in polymer matrices or in coatings at high loadings are known. The loss in mechanical properties such as stiffness due to plasticization effects of small molecule flame retardants (particularly phosphate flame retardants) makes them unattractive in engineering applications where mechanical integrity and flame retardant properties are often highly desired. It is also known that fillers such as glass resin or polymers, silica particles, clay are added to strengthen polymer articles. These fillers are often integrated with the polymer matrix via surface modification of particle surface with silanes and other such molecules.

To address these issues, porous nanoparticles or micro-particles may be imbibed with solutions of the flame retardants and the solvent may then be removed thereby producing flame retardant loaded nanoparticles. These nanoparticles or micro-particles can then be added to polymer matrices or coating formulations as is or surface modified with a silane or similar molecule. These porous particles may be the entirety of the filler added or a smaller fraction of the filler.

In an embodiment, the flame retardant molecule can be solvated in a common solvent that also solubilizes the polymer matrix. In one example, a flame retardant, such as, triphenylphosphine is dissolved in acetone. The solution is then mixed with porous silica particles and then vacuum dried to produce flame retardant infused particles.

In another example, a small amount of polystyrene is co-dissolved with triphenylphosphine in acetone. This solution is then mixed with porous silica particles. The smaller molecule flame retardant diffuses into the interstices of the particle while the larger swollen polystyrene chain occupies the outside of the particle, which when dried is coated with polystyrene chains. This surface modification improves the compatibility of the particles when added to a polystyrene matrix resin during processing.

In an embodiment, compositions and methods of making flame retardant latex particles is disclosed. Latex particles are used in paints, binders, strengthening and impact modifying additives (in cement for example). Latex particles are colloidal in nature and are prepared by emulsion polymerization of a hydrophobic monomer emulsified in a water medium (oil in water continuous phase emulsion) using surfactants. In one embodiment, a molecule that is soluble in the monomeric phase (oil) can be added, which becomes trapped inside the polymerizing latex bead in the micelle. An organic phosphorus containing molecule having flame retardant properties is one such additive. The organophosphorus additive may be combined with the monomeric phase at various loading levels to obtain fire retardant infused latex particles.

In another example, the particles may be made by suspension polymerization, where the initiator is oil soluble or monomer soluble. In yet another example, reactive monomers that contain phosphorus, such as, vinyl phosphonate, can be made to undergo emulsion copolymerization during latex production, thereby incorporating the phosphorus containing monomer within the chemical structure of the polymer making up the latex particle.

Figure 14:
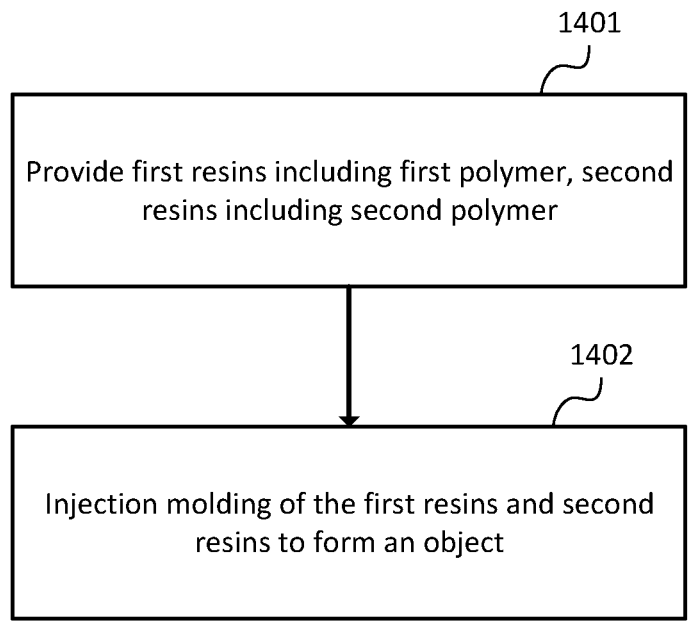
FIG. 14 is a flowchart showing an embodiment of injection molding in accordance with the present disclosure.

The embodiments disclosed herein can be used to form objects by injection molding. As seen in FIG. 14, a plurality of first resins that include a first polymer functionalized with a first functional group and a plurality of second resins that include a second polymer functionalized with a second functional group are provided, illustrated at block 1401. The second functional group is different from and complementary to the first functional group. The first polymer and the second polymer are configured to form a third polymer via crosslinking upon exposure to flame. The first resins and second resins are injection molded to form an object, illustrated at block 1402. The first and second resins can be injection molded simultaneously or sequentially.

Figure 15:
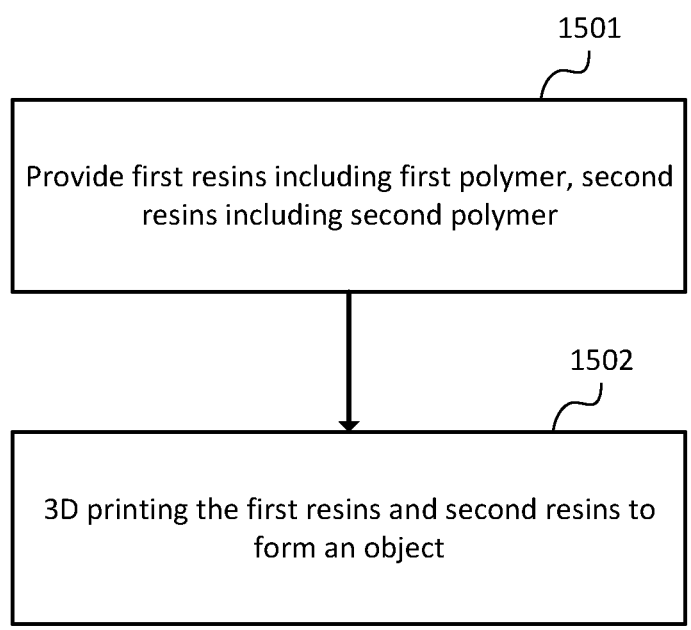
FIG. 15 is a flowchart showing an embodiment of 3D printing in accordance with the present disclosure.

The embodiments disclosed herein also can be used to form objects by 3D printing. As seen in FIG. 15, a plurality of first resins that include a first polymer functionalized with a first functional group and a plurality of second resins that include a second polymer functionalized with a second functional group are provided, illustrated at block 1501. The second functional group is different from and complementary to the first functional group. The first polymer and the second polymer are configured to form a third polymer via crosslinking upon exposure to flame. The first resins and second resins are 3D printed to form an object, illustrated at block 1502. The first and second resins can be 3D printed simultaneously or sequentially.

In an instance, the first polymer and the second polymer are the same and the first functional group and the second functional group are different.

The 3D printing can include fused deposition modeling (FDM). In an instance, at least one of the first resins or the second resins is a filament. For example, both the first resins and the second resins are filaments.

The 3D printing can include selective laser sintering (SLS). In an instance, at least one of the first resins or the second resins is a powder. For example, both the first resins and second resins are powders. The first resins and the second resins may be mixed together prior to the SLS or may be sequentially added on top of each other during the SLS.

Figure 16:
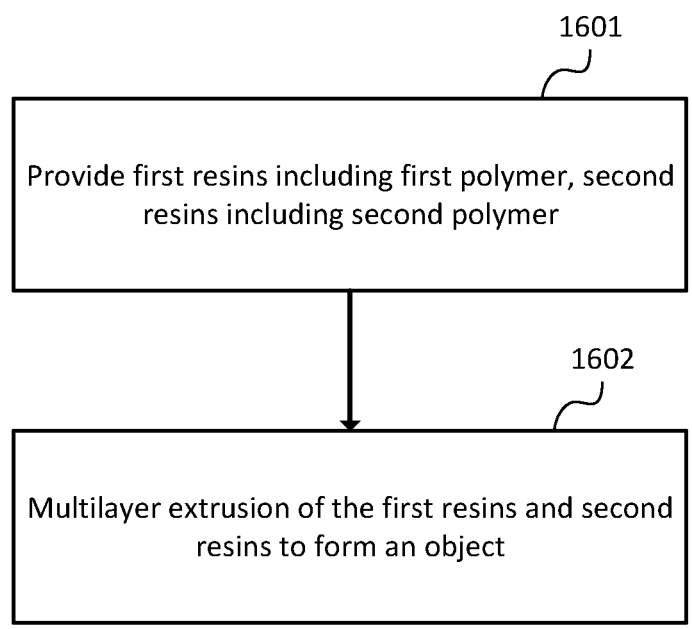
FIG. 16 is a flowchart showing an embodiment of extrusion in accordance with the present disclosure.

The embodiments disclosed herein can be used to form objects by multilayer extrusion. As seen in FIG. 16, a plurality of first resins that include a first polymer functionalized with a first functional group and a plurality of second resins that include a second polymer functionalized with a second functional group are provided, illustrated at block 1601. The second functional group is different from and complementary to the first functional group. The first polymer and the second polymer are configured to form a third polymer via crosslinking upon exposure to flame. Multilayer extrusion of the first resins and the second resins is performed to form an object, illustrated at block 1602. Melts of the first polymer and the second polymer are brought together on top of each other to form a multilayer film.

For injection molding, 3D printing, multilayer extrusion, or other applications, third resins can be added to the first resins and the second resins. The third resins may be selected from the group consisting of acrylonitrile butadiene styrene (ABS), acrylonitrile butadiene styrene/polycarbonate (ABS/PC), engineered thermoplastic polyurethane (ETPU), high density polyethylene (HDPE), liquid crystal polymer (LCP), low density polyethylene (LDPE), linear low density polyethylene (LLDPE), nylon, polybutylene terephthalate (PBT), polycarbonate (PC), polycarbonate/polybutylene terephthalate (PC/PBT), polyetheretherketone (PEEK), polyether imide (PEI), polyethylene terephthalate (PET), copolyester, polylactic acid (PLA), poly(methyl methacrylate) (PMMA), polyoxymethylene, (POM), polypropylene, polyphenylene ether/high impact polystyrene (PPE/PS), polyphthalamide (PPA), polyphenylene sulfide (PPS), high impact polystyrene (PS), polysulfone (PSU), polyvinyl chloride (PVC), polyvinylidine fluoride (PVDF), styrene butadiene (SB), thermoplastic elastomer/thermoplastic vulcanizate (TPE/TPV), thermoplastic polyurethane elastomer (TPU), aramid, and combinations thereof.

For injection molding, 3D printing, multilayer extrusion, or other applications, a plurality of particles may be added into the first resins and the second resins. The particles can include at least one of graphene, carbon, metallic or non-metallic carbonates, metallic or non-metallic oxides, glass particles, glass fibers, silicon, silica, or silicon oxide. The particles may be functionalized as disclosed herein.

Although the compositions, articles, and methods have been described and illustrated in connection with certain embodiments, many variations and modifications will be evident to those skilled in the art and may be made without departing from the spirit and scope of the disclosure. The discourse is thus not to be limited to the precise details of methodology or construction set forth above as such variations and modification are intended to be included within the scope of the disclosure.

What is claimed is:

1. A composition comprising:
   a plurality of first resins that include a first polymer functionalized with a first functional group; and
   a plurality of second resins that include a second polymer functionalized with a second functional group, the second functional group being different from and complementary to the first functional group, wherein the first polymer and the second polymer are configured to form a third polymer via crosslinking upon exposure to flame;
   wherein the first and second resins are configured to form an injected molded article, a 3D printed article, or a multilayer extruded article, and
   at least one of the first functional group and the second functional group comprises a flame retardant and the first polymer or the second polymer is nylon.

2. The composition of claim 1, wherein the first functional group and the second functional group are selected from the following functional group combinations: amine and acids, amine and epoxide, amine and anhydride, amine and isocyanate, amine and aldehyde, amine and alkyl halide, amine and alkyl sulfonate, amine and thiol, epoxide and anhydride, epoxide and hydroxyl, and epoxide and acid.

3. The composition of claim 1, wherein the flame retardant is a phosphorus compound.

4. The composition of claim 1, wherein at least one of the first polymer or the second polymer has a lower melting point than the other and the polymer having a lower melting point contains a reactive crosslinker.

5. The composition of claim 4, wherein the reactive crosslinker comprises an epoxy modified 9,10-dihydro-9-oxy-10-phosphaphenanthrene-10-oxide (DOPO).

6. The composition of claim 1, wherein the first resins and the second resins are different.

7. The composition of claim 1, wherein the first resins and the second resins are the same.

8. The composition of claim 1, further comprising a plurality of functionalized nanoparticles.

9. An injection molded article comprising the composition of claim 1.

10. A 3D printed article comprising the composition of claim 1.

11. A method comprising providing the composition of claim 1; and injection molding the first resins and the second resins of the composition to form an object.

12. The method of claim 11, further comprising adding a plurality of particles into the first resins and the second resins, wherein the particles include at least one of graphene, carbon, metallic or non-metallic carbonates, metallic or non-metallic oxides, glass particles, glass fibers, silicon, silica, or silicon oxide, and wherein the particles are functionalized.

13. A method comprising providing the composition of claims 1; and 3D printing the first resins and the second resins of the composition to form an object.

14. The method of claim 13, wherein the first resins and the second resins are 3D printed simultaneously.

15. The method of claim 13, wherein the first resins and the second resins are 3D printed sequentially.

16. The method of claim 13, wherein the 3D printing includes fused deposition modeling (FDM).

17. The method of claim 16, wherein at least one of the first resins or the second resins is a filament.

18. The method of claim 16, wherein the 3D printing includes selective laser sintering (SLS).

19. The method of claim 18, wherein at least one of the first resins or the second resins is a powder.

* * * * *